US010613619B2

(12) United States Patent
Mukherjee et al.

(10) Patent No.: US 10,613,619 B2
(45) Date of Patent: Apr. 7, 2020

(54) ULTRA-LOW POWER MODE FOR A LOW-COST FORCE-SENSING DEVICE

(71) Applicant: Google LLC, Mountain View, CA (US)

(72) Inventors: Debanjan Mukherjee, San Jose, CA (US); James Brooks Miller, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 200 days.

(21) Appl. No.: 15/844,153

(22) Filed: Dec. 15, 2017

(65) Prior Publication Data

US 2019/0187776 A1 Jun. 20, 2019

(51) Int. Cl.
| | | |
|---|---|---|
| *G06F 1/3296* | (2019.01) | |
| *G06F 1/3293* | (2019.01) | |
| *G06F 1/3203* | (2019.01) | |
| *G06F 1/3206* | (2019.01) | |
| *G05B 15/02* | (2006.01) | |
| *G06F 1/3231* | (2019.01) | |

(Continued)

(52) U.S. Cl.
CPC .......... *G06F 1/3296* (2013.01); *G05B 15/02* (2013.01); *G06F 1/3203* (2013.01); *G06F 1/3206* (2013.01); *G06F 1/3231* (2013.01); *G06F 1/3293* (2013.01); *G06F 1/3287* (2013.01); *G06F 3/017* (2013.01)

(58) Field of Classification Search
CPC .... G06F 1/3287; G06F 1/3206; G06F 1/3231; G06F 1/3293; G06F 3/017; G06F 1/3296; G05B 15/02
USPC ................... 713/300, 323; 715/702; 710/52
See application file for complete search history.

(56) References Cited

U.S. PATENT DOCUMENTS

| | | |
|---|---|---|
| 8,996,332 B2 | 3/2015 | Kahn et al. |
| 9,146,605 B2 | 9/2015 | Lee et al. |

(Continued)

FOREIGN PATENT DOCUMENTS

| | | |
|---|---|---|
| CN | 104280157 | 1/2015 |
| TW | 201719312 | 6/2017 |

OTHER PUBLICATIONS

"International Search Report and Written Opinion", PCT Application No. PCT/US2018/062957, dated Feb. 22, 2019, 16 pages.

(Continued)

*Primary Examiner* — Ji H Bae
(74) *Attorney, Agent, or Firm* — Colby Nipper

(57) ABSTRACT

Techniques and apparatuses are described that provide an ultra-low power mode for a low-cost force-sensing device. These techniques extend battery life of the device by minimizing power consumption for potential wake-up events. To do this, a high-pass filter (e.g., differentiator) is used to evaluate sensor signals in a time domain to provide an estimate of a rate of change of the signal. When the rate of change of the signal deviates from a baseline value by a threshold amount, then a microcontroller is woken to evaluate a large number of historical samples, such as 200 or more milliseconds worth of historical data. If a human gesture is not recognized, then the microcontroller returns to an idle state, but if a human gesture is recognized, then a high-power application processor is woken to execute an application configured to perform an operation mapped to the human gesture.

20 Claims, 5 Drawing Sheets

(51) Int. Cl.
*G06F 3/01* (2006.01)
*G06F 1/3287* (2019.01)

(56) References Cited

U.S. PATENT DOCUMENTS

| | | | |
|---|---|---|---|
| 2014/0032880 A1* | 1/2014 | Ka | G06F 9/3885 712/30 |
| 2014/0149754 A1 | 5/2014 | Silva et al. | |
| 2016/0116343 A1 | 4/2016 | Dixon et al. | |
| 2018/0074636 A1* | 3/2018 | Lee | G06F 3/04886 |

OTHER PUBLICATIONS

"Foreign Office Action", Taiwanese Application No. 107141064, dated Dec. 10, 2019, 9 pages.

* cited by examiner

ULTRA-LOW POWER MODE FOR A LOW-COST FORCE-SENSING DEVICE

BACKGROUND

Many sensors on computing devices require constant supervision in the form of a program that runs on one or more low-power cores in order to wake the device and enable the device to check for a critical event. To do this, the low-power core is regularly woken to read data from the sensor to detect an event, many times due to false alarms. For example, some devices sample at a periodic rate of 50 Hz, which results in the low power core waking 50 times per second to read data. This monitoring and waking of the device consumes power, diminishing battery life of the device.

In addition, many sensors are prone to drift, which is a gradual, often unpredictable change in the sensor input and other components that can cause readings to be offset from an original calibrated state. A variety of different influences can cause drift in the sensor, such as noise, temperature fluctuations, or age. Consequently, drift changes inputs, which would require supervision from the low power core to track and change a signal threshold used to detect critical events.

This background description is provided for the purpose of generally presenting the context of the disclosure. Unless otherwise indicated herein, material described in this section is neither expressly nor impliedly admitted to be prior art to the present disclosure or the appended claims.

SUMMARY

Techniques and apparatuses are described that provide an ultra-low power mode for a low-cost force-sensing device. These techniques extend battery life of the device by minimizing power consumption for potential wake-up events. To do this, the device offloads some work to an analog front-end implemented in hardware, which performs basic checks on sensor signals and wakes a microcontroller (e.g., low-power core) only when an "interesting" event occurs with a threshold level of confidence. Then, the microcontroller analyzes the sensor data in more detail. If the microcontroller determines with high confidence that the input signal corresponds to a human gesture, then the microcontroller wakes an application processor (e.g., high-power core) to handle the human gesture. The application processor may handle the gesture or return to a sleep mode based on additional criteria. These techniques improve upon conventional techniques that regularly wake a microcontroller to check for critical events because the techniques described herein only wake a next level of processing power (that consumes more power) based on a threshold level of confidence in the input signal.

In aspects, a differentiator (e.g., high-pass filter) is used to evaluate sensor signals in a time domain to provide an estimate of a rate of change of the signal. This differentiator is implemented as part of an autonomous system (e.g., the analog front-end) that provides a preliminary evaluation of the sensor signal before waking the microcontroller to do more analysis. When the rate of change of the signal deviates from a baseline value by a threshold amount, then the microcontroller is woken to evaluate a set of historical samples, such as 200 or more milliseconds worth of historical data. If a human gesture is not recognized, then the microcontroller returns to an idle state, but if a human gesture is recognized, then the application processor is woken to execute an application configured to perform an operation mapped to the human gesture.

Aspects described below include a system comprising a plurality of processors and an analog front-end. The plurality of processors include at least a microcontroller and a high-power application processor each configured to be placed in a suspended state (e.g., sleep state). The analog front-end is implemented in hardware and configured to convert an analog signal generated by a force sensor into a digital signal, store samples of the digital signal in a buffer, filter the digital signal based on deviations in a rate of change of the signal from a baseline value, and wake the microcontroller from the suspended state responsive to the filtered digital signal passing one or more threshold values. The microcontroller is woken to analyze the samples of the digital signal in the buffer to determine whether the digital signal corresponds to a human gesture. The microcontroller is configured to wake the high-power application processor from the suspended state to process the human gesture based on the digital signal being recognized as a human gesture.

Aspects described below also include a method comprising generating an input signal based on detection of a force applied to a housing of the mobile device when the mobile device is in a low-power idle state (e.g., sleep state). The method also comprises storing samples of the input signal in a buffer. The method additionally comprises filtering the input signal based on deviations from a baseline rate-of-change of the input signal. The method further comprises triggering an interrupt based on the deviations passing one or more threshold values. The method also comprises waking a microcontroller from the low-power idle state based on the interrupt to analyze the samples in the buffer and determine whether the input signal corresponds to a human gesture.

Aspects described below also include a computing device comprising one or more sensors, a converter, a buffer, a filter, a comparator, and a microcontroller. The one or more sensors are configured to detect a force applied to a housing of the computing device. The converter is configured to generate a signal based on the detected force. The buffer is configured to store samples corresponding to the signal. The filter is configured to filter the signal based on deviations in a rate of change of the signal relative to a baseline value. The comparator is configured to trigger an interrupt based on a deviation in the rate of change of the signal being greater than or lesser than a threshold value or outside of a specified range. The microcontroller is configured to wake from a low-power idle state based on the interrupt and read the samples in the buffer to determine whether the signal corresponds to a human gesture. The microcontroller is also configured to wake a high-power application processor from a low-power idle state responsive to the signal being recognized as a human gesture.

BRIEF DESCRIPTION OF THE DRAWINGS

Apparatuses of and techniques enabling an ultra-low power mode for a low-cost force-sensing device are described with reference to the following drawings. The same numbers are used throughout the drawings to reference like features and components.

DETAILED DESCRIPTION

Overview

Figure 1:
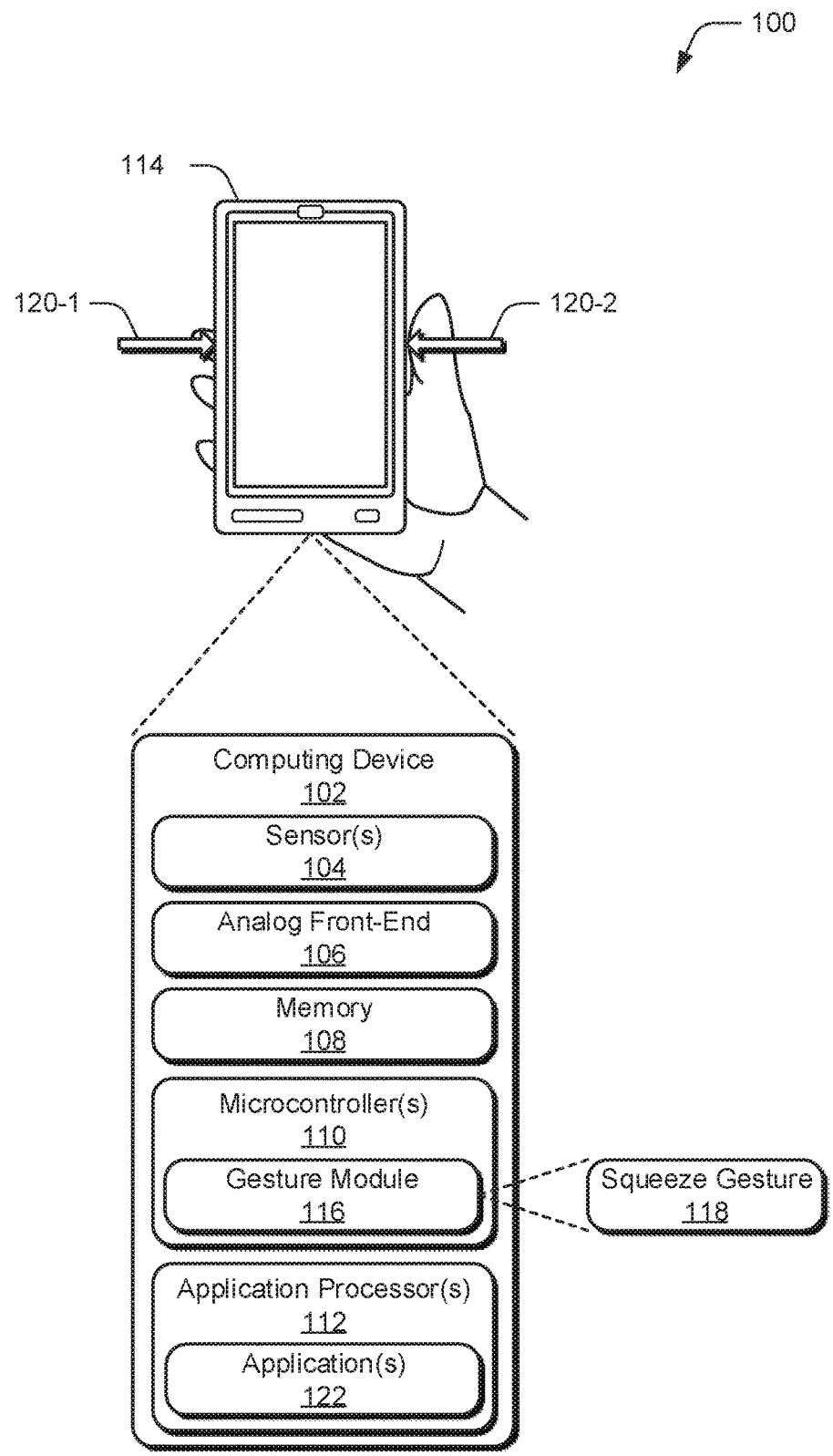
FIG. 1 illustrates an example environment in which a mobile device can be implemented.

Generally, a computing device running in a low-power mode still consumes power by constantly monitoring different sensors used to wake the computing device. This device may be constantly woken up to read data from the sensors to detect an actual event. However, the event may be a false alarm due to a variety of different factors, such as drift in the sensors. Drift can be caused by a variety of different factors, such as mechanical issues caused by material expansion of a component heating non-uniformly, moisture, a relaxation between the sensor and a surface upon which a physical force was applied, and so on. Some sensors may not be prone to large amounts of drift, but such sensors can be cost-prohibitive. In contrast, low-cost sensors are generally prone to drift.

To address these flaws, techniques and apparatuses are described below that provide a low-cost solution that enables ultra-low power mode for a force-sensing device. These techniques and apparatuses also extend battery life of the device by implementing a hardware structure that can autonomously capture sensor data and detect deviations from a baseline that are sufficiently "interesting" to warrant waking a microcontroller to do further analysis on the sensor data. If the microcontroller determines, with high confidence, that the sensor data corresponds to a human gesture, then an application processor (high-power core) is woken to perform an operation associated with the gesture. If, however, it is determined that the sensor data does not correspond to a human gesture, then the application processor is not woken but remains in a low-power mode and the microcontroller returns to its low-power mode. In this way, the microcontroller and the application processor are woken fewer times in comparison to conventional techniques that monitor a direct current (DC) threshold and fail to account for drift in the sensors.

Consider, for example, a case where a person is carrying a smartphone in his pocket. The smartphone may experience some external forces applied to a housing or case from contact with the user's clothing, or a temperature increase based on the smartphone's proximity to the user's body. When the user grips the smartphone, forces are applied to the housing or case. However, none of these situations represent the user's intent to wake the smartphone, but represent potential false positives that could trigger a wake up event, particularly when using low-cost force sensors that are susceptible to drift. When the user squeezes the smartphone on opposing sides, however, the user's intent may be to trigger a wake up event. The techniques and apparatuses described herein reduce the false positives and power consumption by the smartphone when the smartphone is resting in a low-power state because the processor of the smartphone is not required to be awake to operate the force sensors or to verify or reject a potential wake up event.

The following discussion first describes an operating environment, then methods, and ends with an example electronic device and example aspects.

Example Environment

FIG. 1 illustrates an example environment 100 in which an ultra-low power mode for a low-cost force-sensing device can be implemented. Example environment 100 includes a computing device 102 having a sensor(s) 104, an analog front-end 106, a memory 108, a microcontroller(s) 110, and an application processor(s) 112. The computing device 102 is configured to run in the ultra-low power mode in which the microcontroller(s) 110 and the application processor(s) 112 are suspended, or placed in a low-power idle state.

The sensor(s) 104 can include any suitable sensor, such as a force sensor that detects physical force applied to a housing 114 of the computing device. In aspects, the sensor 104 includes a strain gauge, which is integrated on the computing device 102 to mechanically measure strain on the computing device 102, the housing 114, or adhesive between the housing 114 and one or more internal components of the computing device 102. Multiple sensor(s) 104 can be implemented on the computing device 102 to detect forces applied to different areas of the computing device 102, such as opposing sides. In at least one implementation, each sensor 104 can be associated with a different integrated circuit (IC) channel, such that data obtained from each sensor 104 can be read independently of data obtained from the other sensors 104. In one example, however, two sensors 104 on opposing sides of the computing device 102 can be associated with a single IC channel to measure a compression force applied to the computing device 102. Accordingly, any suitable sensor 104 can be used to measure force applied to the computing device 102.

The analog front-end 106 can autonomously determine if data obtained by the sensor(s) 104 warrants waking the microcontroller(s) 110 to analyze the data. The analog front-end 106 converts a signal, such as an analog signal, obtained from the sensor(s) 104 into a digital signal. The analog front-end 106 also filters the digital signal based on a rate of change of the digital signal relative to a baseline value, and then triggers a wake up event for the microcontroller 110 if the rate of change is above a certain threshold. In addition, the analog front-end 106 stores raw sensor data in the memory 108, such as in a buffer, to enable the microcontroller 110, once awoken, to perform gesture analysis on the raw sensor data.

The microcontroller 110 is representative of a low-power computing entity, such as a low-power core directly attached to the analog front-end 106. The microcontroller 110 can be woken from the low-power idle state to employ a gesture module 116 to determine whether the raw sensor data corresponds to a human gesture. In an example, the human gesture includes a squeeze gesture 118 in which a compression force is applied to opposing sides of the housing 114 or cover of the computing device 102, as illustrated by arrows 120-1 and 120-2. Although the example compression force (e.g., arrows 120-1, 120-2) is illustrated as being applied to left and right sides of the computing device any side (e.g., top, bottom, front, back, left side, right side) may be used to detect the compression force. If the compression force is greater than a predefined threshold value, then a human gesture (e.g., the squeeze gesture 118) may be recognized. If a human gesture is recognized, then the microcontroller 110 wakes the application processor 112 to perform an operation associated with the gesture.

The application processor(s) 112 is representative of a high-power core, such as an ARM processor, capable of running system services and user application code. To conserve power, the application processor(s) 112 remains in the low-power idle state until the microcontroller 110 wakes the application processor(s) 112. Once awoken, the application processor(s) 112 can execute an application 122 to handle the gesture, such as by performing an operation associated with the recognized gesture.

At least the sensor(s) 104 and the analog front-end 106 are implemented in hardware and can operate autonomously, which allows the microcontroller(s) 110 and the application processor(s) 112 to remain in the low-power idle state for longer periods of time, resulting in a longer battery life.

Figure 2:
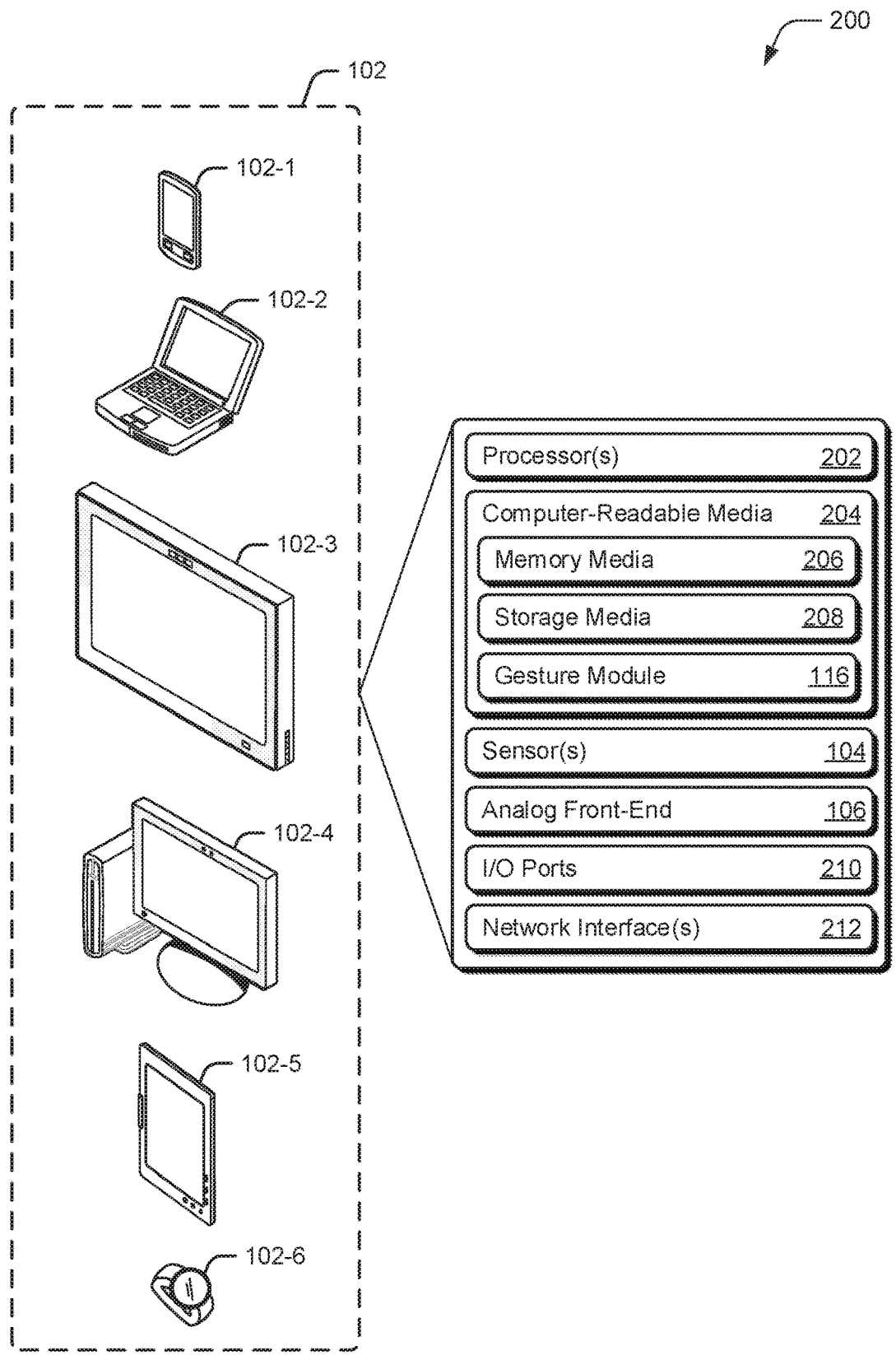
FIG. 2 illustrates elements of FIG. 1 in greater detail.

Consider FIG. 2, which illustrates an example implementation 200 of the computing device 102 of FIG. 1 in greater detail in accordance with one or more aspects. The computing device 102 is illustrated with various non-limiting example devices: smartphone 102-1, laptop 102-2, television 102-3, desktop 102-4, tablet 102-5, and wearable computer 102-6. The computing device 102 includes computer processor(s) 202 and computer-readable media 204, which includes memory media 206, storage media 208, and the gesture module 116. Applications and/or an operating system (not shown) embodied as computer-readable instructions on computer-readable media 204 can be executed by the processor(s) 202 (e.g., application processor(s) 112) to provide some of the functionalities described herein. The computer-readable media 204 also includes the gesture module 116, which can recognize user input as one or more gestures, such as the squeeze gesture 118, that are mapped to particular operations.

The mobile computing device 102 also includes the sensor(s) 104, the analog front-end 106, I/O ports 210, and network interfaces 212. I/O ports 210 can include a variety of ports, such as by way of example and not limitation, high-definition multimedia interface (HDMI), digital video interface (DVI), display port, fiber-optic or light-based, audio ports (e.g., analog, optical, or digital), universal serial bus (USB) ports, serial advanced technology attachment (SATA) ports, peripheral component interconnect (PCI) express based ports or card slots, serial ports, parallel ports, or other legacy ports. The mobile computing device 102 may also include the network interface(s) 212 for communicating data over wired, wireless, or optical networks. By way of example and not limitation, the network interface 212 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Figure 3:
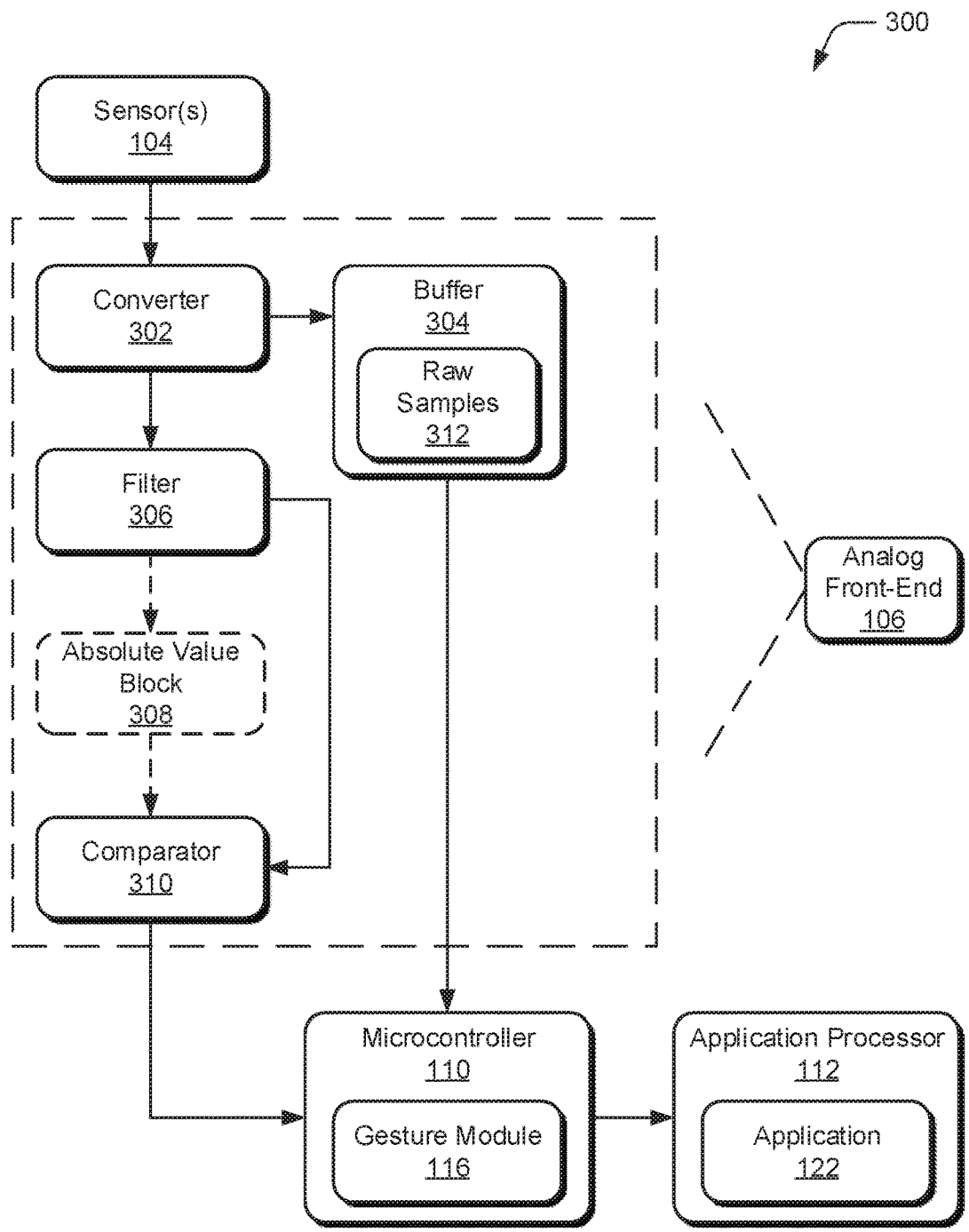
FIG. 3 illustrates example implementation of hardware components of a force-sensing device configured for managing an ultra-low power mode.

Having described the computing device 102 of FIG. 2 in greater detail, this discussion now turns to FIG. 3, which illustrates an example implementation 300 of hardware components of a force-sensing device configured for an ultra-low power mode. The example implementation represents a single integrated circuit (IC) channel. However, a plurality of IC channels may be implemented, each with an independent path. In some examples, a subset of IC channels may share a single path.

In FIG. 3, the sensor(s) 104 generates an analog signal that is sent to the analog front-end 106. The analog front-end 106 from FIG. 1 is illustrated as including a converter 302, a buffer 304, a filter 306, an optional absolute value block 308, and a comparator 310. The converter 302 can include any suitable converter, such as an analog-to-digital (AD) converter. The converter 302 converts the analog signal from the sensor(s) 104 into a digital signal and stores raw samples of the converted signal in the buffer 304, which allows the raw samples 312 to be available as historical data for subsequent analysis. In addition, the converter 302 sends the digital signal to the filter 306.

The buffer 304 can be any suitable buffer. For low-cost implementations in terms of power, an example buffer 304 can be a first-in-first-out (FIFO) buffer or a ring buffer. The buffer can include any suitable depth, such as 250 milliseconds, 500 milliseconds, 750 milliseconds, 1.0 second, and so on. As described further below, the depth of the buffer depends on an amount of raw samples 312 (e.g., historical data) of the digital signal that are desired for gesture detection. In implementations, the buffer includes one entry per AD converter sample and stores the samples in sequence. When multiple channels are used, the buffer 304 can be shared among all the channels or a subset of the channels.

The filter 306 is configured to perform "baselining", which effectively removes a DC component from the digital signal. In at least one example, the filter 306 can take the first derivative of the digital signal to determine the rate of change (e.g., slope) of the signal. An instantaneous derivative can be obtained using the difference between the last two samples. However, the instantaneous derivative merely provides an estimate of the rate of change and is prone to trigger false alarms based on noise or drift. Alternatively, the derivative can be obtained using a high-pass filter, which allows derivatives above a certain value. The filter can be of any type and may be selected to minimize power and hardware. The filter can be implemented in hardware, such as silicon, with a set of fixed coefficients to form an autonomous high-pass filter. Consequently, the filter 306 can be implemented with low power.

In an example, the filter 306 can be a high-pass filter with a predictable cutoff and phase delay. Alternatively, the filter 306 can be a band-pass filter that is configured for a band of interest, such as within a band of 5 Hz to 15 Hz.

The filter 306 includes one or more coefficients to provide a high pass representation of the signal. Because the filter 306 determines the rate of change of the signal, the high pass representation of the signal is relative to a baseline rate of change. Thus, for a noisy, drifty sensor, the noise and drift in the signal are reduced or removed by the filter 306. For example, if the sensor 104 drifts up one value per second, then that value becomes the baseline rate of change, and portions of the signal changing at a slower rate are dismissible. Portions of the signal above the baseline rate of change leak through the filter and are passed on as filtered data. Accordingly, the filter 306 is configured to minimize false activation while maintaining adequate fidelity for gesture recognition. For example, the filter 306 is set higher than the drift but lower than a human gesture that is to be recognized.

After the baseline is established by the filter 306, an absolute value block 308 is optionally used to remove negative values of the filter data. This saves the cost of additional digital logic that would be required to find negative value deviations from the baseline.

The comparator 310 compares the filtered data to one or more registers (e.g., threshold values) to identify events that may be of interest. These events can exceed a maximum or minimum value, either of which may indicate a human gesture. Separate threshold values can be used to identify different types of human gestures, such as a squeeze-and-hold gesture, a quick squeeze-and-release gesture, a double squeeze-and-release gesture, and so on. In at least one implementation, these events can indicate "no activity" based on the filtered data settling to zero for a length of time. Events of interest may include deviations from the baseline above a known noise frequency caused by temperature drift or other sensor characteristics. In one example, a gesture may begin when the raw digital signal deviates by more than 1000 AD converter counts from the baseline. As such, the comparator register can be set to around 1000 counts. If there are multiple registers or the sensor(s) 104 are reversed electronically or mechanically, then the system can also listen for negative 1000 counts. If the comparator has two registers, then the threshold values can be set at {−1000, 1000}. If the absolute value block 308 is used, a single threshold value of 1000 counts can be used to identify deviations outside of the {−1000, 1000} range. Due to the finite filter frequencies, this threshold may be adjusted.

When the deviations from the baseline rate of change of the signal rise above the absolute value of the threshold value, an interrupt can be triggered to wake the microcontroller 110 from a low-power idle state. The microcontroller 110 comprises a low-power core that is responsible for management of the analog front-end 106. The microcontroller 110 can also respond to interrupts from the analog front-end 106. In an example implementation, the microcontroller 110 is a digital signal processor (DSP) on a system-on-chip (SOC) designed for low-power operation, allowing the microcontroller 110 to handle infrequent events from the analog front-end 106 with near-zero power cost. Once awoken, the microcontroller 110 can execute the gesture module 116 to analyze the raw samples 312 (e.g., historical data) in the buffer 304 and determine whether the samples 312 correspond to a human gesture. Each sample 312 in the historical data may include information indicating a channel from which it was received and an indicator of whether that particular sample was associated with a comparator event that woke the microcontroller 110.

Using this information, the microcontroller 110 can roll back the historical data to discover an "interesting" part that triggered the wake up event of the microcontroller 110. In addition, continuity in the stream of data between sleep and wake states may be maintained. For instance, detection in the analog front-end 106 and consequent wakeup of the microcontroller 110 should be fast so as to not drop samples. To avoid dropping samples too quickly, the buffer 304 in the analog front-end 106 has a depth large enough to accommodate latency in waking the microcontroller 110. Some examples buffer depths include 45, 64, or 75 data items, but other buffer depths are also contemplated to accommodate the latency in waking the processor(s).

If a human gesture is not recognized, then the microcontroller 110 can return to the low-power idle state, thus preserving battery power. If a human gesture is recognized, however, then the microcontroller 110 wakes the application processor 112 from the low-power idle state.

The application processor 112 can be any suitable high-power core that can execute a variety of different applications 122. For instance, the application processor 112 can execute the application 122 to handle the human gesture, such as by turning on a display device of the computing device 102. In another example, the application processor 112 can initiate another application, such as an image-capturing application, based on the human gesture. In this way, when a user's smartphone is in a low-power mode, the user can squeeze opposing sides of the smartphone to not only wake the smartphone, but also initiate a camera application on the smartphone to quickly prepare for capturing an image. In at least one example, the application processor 112 responds to high-confidence gesture recognition (e.g., fully recognized gestures) from the microcontroller 110, and remains in the low-power idle state otherwise.

Using these techniques, the computing device 102 can utilize an ultra-low power mode in which both the microcontroller 110 and the application processor 112 are in the low-power idle state. During the ultra-low power mode, the autonomously functioning analog front-end 106 filters the sensor signals based on a rate of change of the signals, and wakes the microcontroller 110 when the rate of change deviates from a baseline rate of change above a known noise frequency. Then, the microcontroller 110 analyzes the sensor signals to recognize a gesture, and wakes the application processor 112 based on high-confidence gesture recognition. The application processor 112 can then handle the gesture. This ultra-low power mode may result in extended battery life of the computing device 102 due to both the microcontroller 110 and the high-power application processor 112 being woken from the low-power idle state less frequently in comparison to conventional techniques that constantly monitor DC thresholds and fail to account for drift in the sensors.

Having generally described the environment in which techniques and apparatuses for an ultra-low power mode for a force-sensing device can be implemented, this discussion now turns to example methods.

Example Methods

Figure 4:
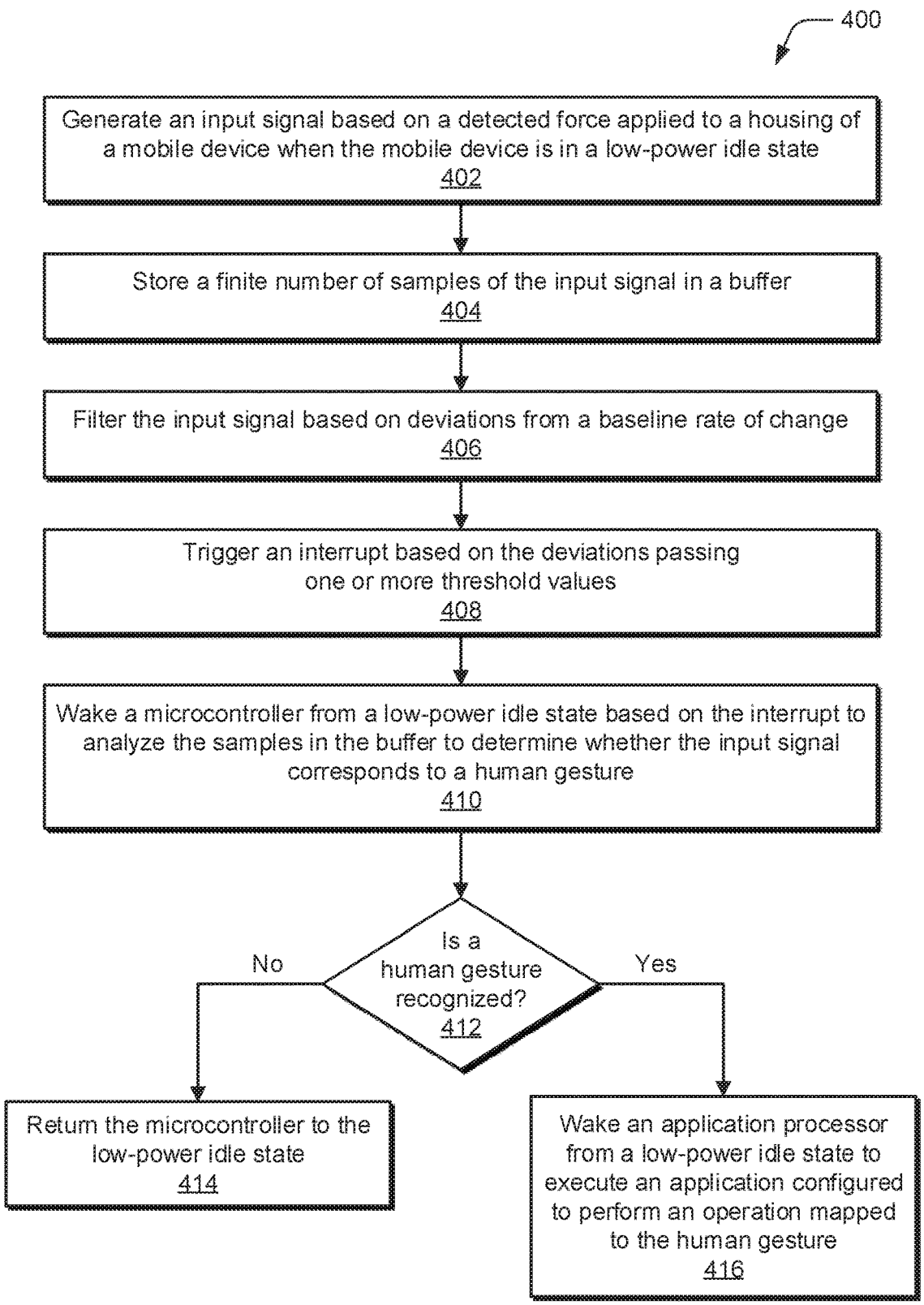
FIG. 4 illustrates example methods for an ultra-low power mode for a force-sensing device.

The following discussion describes methods for an ultra-low power mode for a force-sensing device. These methods can be implemented utilizing the previously described examples, such as the computing device 102 from FIG. 1. Aspects of these methods are illustrated in FIG. 4, which are shown as operations performed by one or more entities. The orders in which operations of these methods are shown and/or described are not intended to be construed as a limitation, and any number or combination of the described method operations can be combined in any order to implement a method, or an alternate method.

FIG. 4 illustrates example method 400 for managing an ultra-low power mode for a force-sensing device.

At 402, an input signal is generated based on a detected force applied to a housing of a mobile device when the mobile device is in a low-power idle state. For instance, force sensors (e.g., sensors 104 from FIG. 1) provide an analog signal when a compression force is applied to the housing of the mobile device, and a converter (e.g., converter 302 from FIG. 3) convert the analog signal into a digital signal.

At 404, samples of the input signal are stored in a buffer. For example, the converter 302 sends filtered samples to the buffer (e.g., buffer 304). In implementations, the buffer is a FIFO buffer configured to hold about 1.0 second of samples.

At 406, the input signal is filtered based on deviations from a baseline rate of change of the input signal. In an example, a filter (e.g., filter 306 from FIG. 3) filters the filtered input signal in the time domain, such as by determining the rate of change of the input signal relative to a baseline rate of change. The baseline rate of change may correspond to a rate of change caused by drift in the sensors.

At 408, an interrupt is triggered based on the deviations passing one or more threshold values. The one or more threshold values may correspond to a register of a comparator, such as comparator 310 from FIG. 3. In implementations, the register may be set based on coefficients of hardware materials used to implement the analog front-end 106 of FIG. 2.

At 410, a microcontroller is woken from a low-power idle state based on the interrupt to analyze the samples in the buffer and determine whether the input signal corresponds to a human gesture. The microcontroller (e.g., microcontroller 110 of FIG. 1) may execute a gesture module (e.g., gesture module 116 of FIG. 1) to read the raw samples stored in the buffer.

At 412, a determination is made as to whether the input signal is recognized as a human gesture. In an example, the gesture module 116 may determine that the raw samples stored in the buffer correspond to a human gesture based on an amount of force applied to the housing and a time associated with the applied force.

If at 412 the input signal is rejected as a human gesture based on the samples in the buffer (e.g., NO), then at 414, the microcontroller is returned to the low-power idle state. For example, if the data in the buffer does not match or correspond to a human gesture (e.g., the force is too weak, or is held for too short or long), then there is no need to wake a high-power application processor and the microcontroller can return to the low-power idle state.

If at 412 the input signal is recognized as a human gesture based on the samples in the buffer (e.g., YES), then at 416, an application processor is woken from a low-power idle state based on recognition of the human gesture to execute an application configured to perform an operation mapped to the human gesture. In an example, if the gesture module determines, with high confidence, that the gesture is in fact a human gesture, then an interrupt is generated to wake the high-power application processor to allow the application processor process the gesture, such as by powering on a display device and/or initiating an application.

The preceding discussion describes methods relating to managing an ultra-low power mode for a force-sensing device. Aspects of these methods may be implemented in hardware (e.g., fixed logic circuitry), firmware, software, manual processing, or any combination thereof. These techniques may be embodied on one or more of the entities shown in FIGS. 1-3 and 5 (computing system 500 is described in FIG. 5 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Computing System

Figure 5:
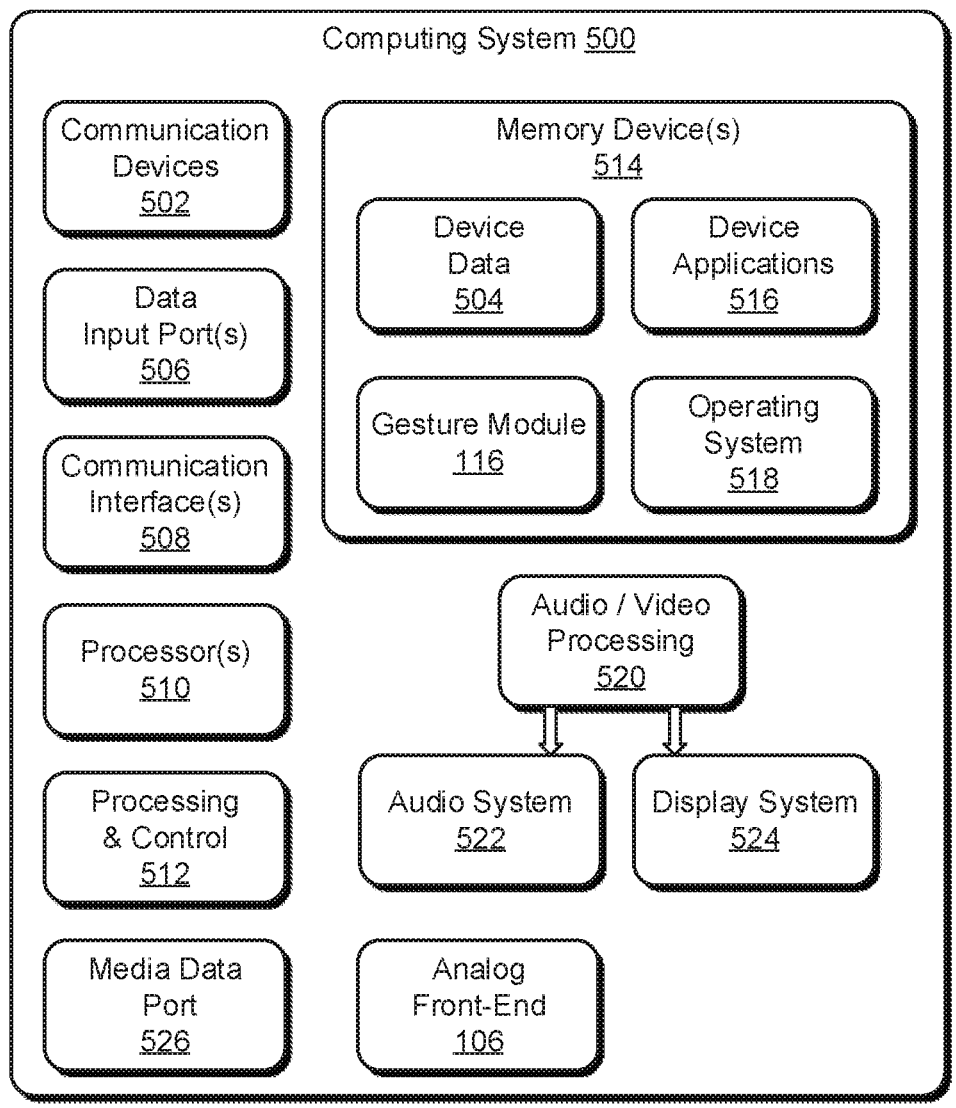
FIG. 5 illustrates various components of an example computing system that can implement an ultra-low power mode in a force-sensing device in accordance with one or more aspects.

FIG. 5 illustrates various components of example computing system 500 that can be implemented as any type of client, server, and/or computing device as described with reference to the previous FIGS. 1-4 to enable an ultra-low power mode for a force-sensing device. In aspects, the computing system 500 can be implemented as one or a combination of a wired and/or wireless wearable device, System-on-Chip (SoC), and/or as another type of device or portion thereof. The computing system 500 may also be associated with a user (e.g., a person wishing to wake the computing system from the ultra-low power mode) and/or an entity that operates a device such that the device describes logical devices that include software, firmware, and/or a combination of devices.

The computing system 500 includes the analog front-end 106 of FIGS. 1-3, though this component need not be exactly as illustrated. The analog front-end 106 can be integral with the computing system 500 through integration with a mother board, or separate from, but within the computing systems 500 frame, chassis, or other structure.

The computing system 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on the computing system 500 can include any type of audio, video, and/or image data, and can be a resource or information to which access is desired. The computing system 500 includes one or more data input ports 506 via which any type of data, media content, and/or inputs can be received, such as human utterances, user-selectable inputs (explicit or implicit), physical, selectable structures, messages, music, television media content, recorded video content, and any other type of audio, video, and/or image data received from any content and/or data source.

The computing system 500 also includes communication interfaces 508, which can be implemented as any one or more of a serial and/or parallel interface, a wireless interface, any type of network interface, a modem, and as any other type of communication interface, such as near field communication (NFC) wireless interfaces. The communication interfaces 508 provide a connection and/or communication links between the computing system 500 and a communication network by which other electronic, computing, and communication devices communicate data with the computing system 500.

The computing system 500 includes one or more processors 510 (e.g., any of microcontrollers, application processors, digital-signal-processors, controllers, and the like), or a processor and memory system (e.g., implemented in a SoC), which process (e.g., execute) various computer-executable instructions to control operation of the computing system 500 and to enable techniques for, or in which can be embodied, an ultra-low power mode for a force-sensing device. Alternatively or in addition the computing system 500 can be implemented with any one or combination of hardware, firmware, or fixed logic circuitry that is implemented in connection with processing and control circuits, which are generally identified at 512 (processing and control 512).

Although not shown, the computing system 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 500 also includes one or more memory devices 514 that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Memory device(s) 514 provide data storage mechanisms to store the device data 504, other types of information and/or data, and various device applications 516 (e.g., software applications). For example, operating system 518 can be maintained as software instructions within memory device 514 and executed by processors 510. In some aspects, the gesture module 116 is embodied in memory devices 514 of the computing system 500 as executable instructions or code. Although represented as a software implementation, the gesture module 116 may be implemented as any form of a control application, software application, signal-processing and control module, or hardware or firmware installed on the computing system 500.

The computing system 500 also includes audio and/or video processing system 520 that processes audio data and/or passes through the audio and video data to audio system 522 and/or to display system 524 (e.g., a screen of a smartphone or camera). Audio system 522 and/or display system 524 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 526. In some implementations, audio system 522 and/or display system 524 are external components to computing system 500. Alternatively or additionally, display system 524 can be an integrated component of the computing system 500, such as part of an integrated touch interface.

Although aspects of an ultra-low power mode for a force-sensing device have been described in language specific to features and/or methods, the subject of the appended claims is not necessarily limited to the specific features or methods described. Rather, the specific features and methods are disclosed as example implementations of an ultra-low power mode for a force-sensing device.

What is claimed is:

1. A system comprising:
a plurality of processors including at least a microcontroller and a high-power application processor each configured to be placed in a suspended state; and
analog front-end circuitry configured to:
convert an analog signal generated by a force sensor into a digital signal;
store samples of the digital signal in a buffer;
filter the digital signal based on deviations in a rate of change of the signal from a baseline value; and
responsive to the filtered digital signal passing one or more threshold values, wake the microcontroller from the suspended state to analyze the samples of the digital signal in the buffer to determine whether the digital signal corresponds to a human gesture, the microcontroller configured to wake the high-power application processor from the suspended state to process the human gesture based on the digital signal being recognized as a human gesture.

2. The system of claim 1, wherein the analog front-end circuitry is configured to function autonomously.

3. The system of claim 1, wherein the buffer comprises a first-in-first-out (FIFO) buffer configured to store up to about one second of the samples.

4. The system of claim 1, wherein the filter comprises a high-pass filter or a band-pass filter.

5. The system of claim 1, wherein the microcontroller is configured to return to the suspended state responsive to the signal being rejected as the human gesture.

6. The system of claim 1, wherein the system includes a plurality of integrated circuit channels each associated with a separate filter.

7. The system of claim 1, wherein the system includes a plurality of integrated circuit channels each associated with a separate filter, and wherein the buffer is shared among a subset of the plurality of integrated circuit channels.

8. The system of claim 1, wherein the force sensor comprises a strain gauge that measures force applied to a housing, and the human gesture comprises a squeeze gesture that applies the force to opposing sides of the housing.

9. A method for managing an ultra-low power mode for a mobile device, the method comprising:
generating an input signal based on detection of a force applied to a housing of the mobile device when the mobile device is in a low-power idle state;
storing samples of the input signal in a buffer;
filtering the input signal based on deviations from a baseline rate-of-change of the input signal;
triggering an interrupt based on the deviations passing one or more threshold values; and
waking a microcontroller from the low-power idle state based on the interrupt to analyze the samples in the buffer and determine whether the input signal corresponds to a human gesture.

10. The method of claim 9, further comprising:
recognizing the input signal as the human gesture based on the samples in the buffer; and
waking an application processor from the low-power idle state based on recognition of the human gesture to execute an application configured to perform an operation mapped to the human gesture.

11. The method of claim 10, wherein detecting a force applied to a housing comprises detecting a compression force applied to opposing sides of the housing.

12. The method of claim 9, further comprising:
rejecting the input signal as the human gesture based on the samples in the buffer; and
returning the microcontroller to the low-power idle state.

13. The method of claim 9, wherein the input signal is generated by one or more force sensors.

14. The method of claim 9, wherein filtering the input signal includes using a high-pass filter or a band-pass filter.

15. The method of claim 9, wherein triggering an interrupt comprises triggering the interrupt based on an absolute value of the deviations being greater than at least one of the one or more threshold values.

16. A computing device comprising:
one or more sensors configured to detect a force applied to a housing of the computing device;
an analog-to-digital converter configured to generate a signal based on the detected force;
a buffer configured to store samples corresponding to the signal;
a high-pass filter configured to filter the signal based on deviations in a rate of change of the signal relative to a baseline value;
a comparator circuit configured to trigger an interrupt based on a deviation in the rate of change of the signal being greater than or lesser than a threshold value; and
a microcontroller configured to wake from a low-power idle state based on the interrupt and read the samples in the buffer to determine whether the signal corresponds to a human gesture, the microcontroller configured to wake a high-power application processor from a low-power idle state responsive to the signal being recognized as a human gesture.

17. The computing device of claim 16, wherein the human gesture comprises a squeeze gesture that applies the force to opposing sides of the housing.

18. The computing device of claim 16, wherein the high-pass filter comprises a differentiator that removes drift and noise from signals generated by the one or more sensors.

19. The computing device of claim 16, wherein the microcontroller is configured to return to the low-power idle state responsive to a determination that the signal is not the human gesture.

20. The computing device of claim 16, wherein the one or more sensors, the analog-to-digital converter, and the high-pass filter are implemented in hardware.

\* \* \* \* \*